(12) United States Patent
Wurth

(10) Patent No.: US 7,543,458 B1
(45) Date of Patent: Jun. 9, 2009

(54) PORTABLE VAPOR CYCLE AIR CONDITIONING UNIT FOR SMALL AIRCRAFT

(76) Inventor: James Wurth, 20 S. Camino Blanco, Wickenburg, AZ (US) 85390

( * ) Notice: Subject to any disclaimer, the term of this patent is extended or adjusted under 35 U.S.C. 154(b) by 284 days.

(21) Appl. No.: 11/347,041

(22) Filed: Feb. 3, 2006

Related U.S. Application Data

(60) Provisional application No. 60/650,238, filed on Feb. 4, 2005.

(51) Int. Cl.
*F25D 21/00* (2006.01)
(52) U.S. Cl. .......................................... 62/272; 62/401
(58) Field of Classification Search .................. 62/272, 62/401
See application file for complete search history.

(56) References Cited

U.S. PATENT DOCUMENTS

| | | | |
|---|---|---|---|
| 3,777,506 A | 12/1973 | Hergatt et al. | |
| 4,098,093 A | 7/1978 | Czyl | |
| 4,450,900 A * | 5/1984 | Nathan | 96/26 |
| 4,490,989 A | 1/1985 | Keen | |
| 4,674,294 A | 6/1987 | D'Agaro | |
| 5,031,690 A * | 7/1991 | Anderson et al. | 165/43 |
| 5,386,823 A * | 2/1995 | Chen | 128/204.15 |
| 5,661,984 A | 9/1997 | Durrell et al. | |
| 6,105,383 A | 8/2000 | Reimann et al. | |
| 6,422,030 B1 | 7/2002 | Calvert | |
| 6,571,568 B1 | 6/2003 | Link | |
| 6,971,249 B1 * | 12/2005 | Blackstone | 62/421 |
| 2002/0124574 A1 | 9/2002 | Guttman et al. | |
| 2003/0230109 A1 | 12/2003 | Link | |

* cited by examiner

*Primary Examiner*—Melvin Jones
(74) *Attorney, Agent, or Firm*—Parsons & Goltry; Robert A. Parsons; Michael W. Goltry

(57) ABSTRACT

A portable vapor cycle air conditioning unit for small aircraft includes a single portable module housing an evaporator, a condenser and cooling coils operably connected together. The module is designed to be positioned within a cabin of the small aircraft so that cabin air is drawn into a cabin air inlet in the module, passes over the cooling coils, and is expelled through a cabin air outlet. Air ducts are coupled to the module for conveying fresh air from a window of the small aircraft and waist heat air to a window of the small aircraft. A blower in the module is coupled to direct the fresh air over the condenser and direct the waist heat out through the window. A venturi system in the module is positioned to draw condensate from the evaporator and expel the condensate with the waist heat air.

10 Claims, 4 Drawing Sheets

PORTABLE VAPOR CYCLE AIR CONDITIONING UNIT FOR SMALL AIRCRAFT

CROSS-REFERENCE TO RELATED APPLICATION

This application claims the benefit of U.S. Provisional Application No. 60/650,238, filed 4 Feb. 2005.

FIELD OF THE INVENTION

This invention relates to portable air conditioning units and more specifically to portable vapor cycle air conditioning units for small aircraft

BACKGROUND OF THE INVENTION

In the prior art, all air conditioning units for aircraft, such as helicopters and small airplanes, are air conditioned with permanently installed air conditioners. Generally these units are mounted to the mainframe and may be divided into several different modules. The various components or modules are connected via permanent hoses and electrical connections. Because of the various components and connections, these prior art systems are heavier than a single modular portable unit. Also, because these units are installed permanently, the aircraft must carry the additional weight of the air conditioner whether it is being used or not.

However, a portable unit is difficult to use in small aircraft because ducts cannot be easily installed to remove waist heat from the condenser. Generally, even if portable or semi-portable air conditioners are used the ducting must be permanent and in some instances, such as the BAK-109 used on the Beech 18 and DC-3, the airframe was permanently altered to allow for the ducting. Thus, these prior art air conditioners had to be installed when the aircraft was manufactured or as a retrofit in the factory.

It would be highly advantageous, therefore, to remedy the foregoing and other deficiencies inherent in the prior art.

Accordingly, it is an object of the present invention to provide a new and improved portable vapor cycle air conditioning unit for small aircraft.

Another object of the invention is to provide a new and improved vapor cycle air conditioning unit that is easy to install and remove.

Another object of the invention is to provide a new and improved vapor cycle air conditioning unit that does not require any permanent alterations of the aircraft.

Another object of the invention is to provide a new and improved vapor cycle air conditioning unit in which normal condensate within the air conditioning unit is eliminated without requiring any permanent alterations of the aircraft.

Still another object of the invention is to provide a new and improved vapor cycle air conditioning unit that requires a very small space.

SUMMARY OF THE INVENTION

Briefly, to achieve the desired objects of the instant invention in accordance with a preferred embodiment thereof, provided is a portable vapor cycle air conditioning unit for small aircraft comprising. The unit includes a single portable module housing an evaporator, a condenser and cooling coils operably connected together. The module is designed to be positioned within a cabin of the small aircraft so that cabin air is drawn into a cabin air inlet in the module, passes over the cooling coils, and is expelled through a cabin air outlet. A first air duct has a fresh air inlet end with mounting apparatus for mounting the fresh air inlet end in a window of the small aircraft and a fresh air outlet end. A second air duct has a waist heat air outlet end with mounting apparatus for mounting the waist heat air outlet end in a window of the small aircraft and a waist heat air inlet end. A blower is positioned in communication with the fresh air outlet end of the first air duct and the waist heat air inlet end of the second air duct for flowing the fresh air from the first air duct over the condenser and carrying waist heat out through the second air duct.

The desired objects of the instant invention are further achieved through the incorporation of a venturi system positioned within the module to draw condensate from the evaporator and expel the condensate through the waist heat air outlet end of the second air duct. In a preferred embodiment the venturi system includes at least one venturi tube positioned in the blower and coupled to a drain in the evaporator for drawing condensate from the evaporator, through the drain, and out the venturi tube.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
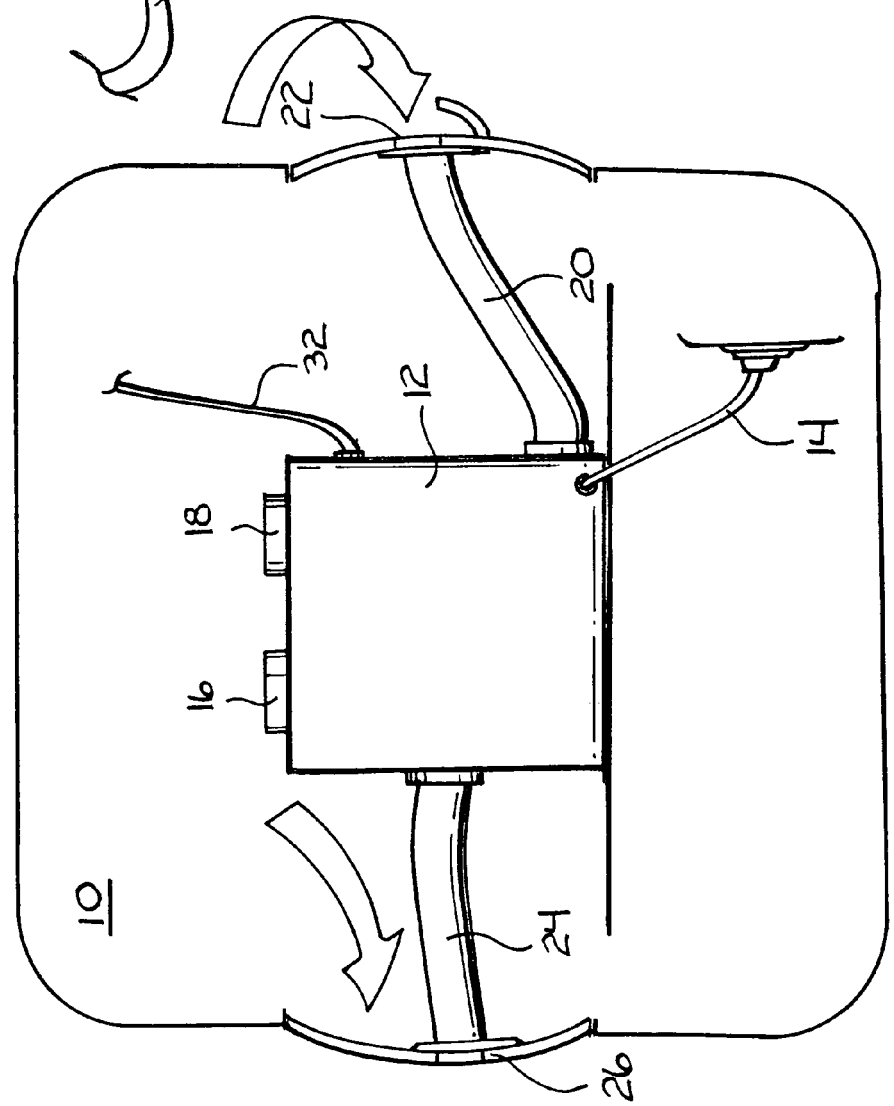
FIG. 1 is a side view of one embodiment of a portable vapor cycle air conditioning unit for small aircraft in accordance with the present invention.

Turning now to the drawings in which like reference characters indicate corresponding elements throughout the several views, attention is first directed to FIG. 1, which illustrates one embodiment of a portable vapor cycle air conditioning unit 10 in accordance with the present invention. As can be seen from FIG. 1, portable vapor cycle air conditioning unit 10 includes a single module 12 that is approximately 24 inches long by 24 inches wide by 8 inches deep. The single module is constructed to operate from 28 volts DC, which is a standard power on most small aircraft, rather than the 110 volts or 220 volts used by most portable air conditioning units in homes and offices. A cable 14 is connected at one end within the single module 12 to supply power to the module and the other end is adapted to be connected to the aircraft power (e.g. by a standard electrical plug or the like).

A cabin air inlet vent 16 is positioned at, in this embodiment, the top of module 12 and a cabin air outlet vent 18 is positioned on the top and adjacent vent 16. As is known in the art, internal fans or the like move air from the cabin into module 12 through inlet vent 16, across internal cooled coils or the like and then move the cool air back into the cabin through outlet vent 18. While the inlet and outlet vents 16 and 18 are shown on top of module 12, it should be understood that portable vapor cycle air conditioning unit 10 operates equally well either flat on a surface or on end, as shown in FIG. 1, depending upon installation requirements for a specific aircraft or position in the aircraft.

As understood by those skilled in the art, a condenser within module 12 is instrumental in cooling the coils within module 12. To provide for the proper operation and cooling of the condenser, air is received from outside the aircraft by way of an air inlet duct 20. Duct 20 is a flexible duct with one end attached to an opening in a window, designated 22 in FIG. 1, and the other end attached to module 12 at one side thereof. A second duct 24 is provided for removing waist heat from the condenser in module 12. One end of duct 24 is attached to module 12 to receive air that was introduced into module 12 through duct 20 after the air has passed through or over the condenser. The other end of duct 24 is attached to an opening in a window, designated 26 in FIG. 1.

Here it should be noted that a major problem with air conditioning units in helicopters and small fixed wing airplanes is the disposal of condensate from the evaporators. In automobile air conditioners, for example, the condensate or water is simply drained onto the ground under the automobile by gravity. This is very hard to accomplish in aircraft without cutting a hole in the skin, which can cause problems in the aircraft and requires special FAA approval.

Figure 6:
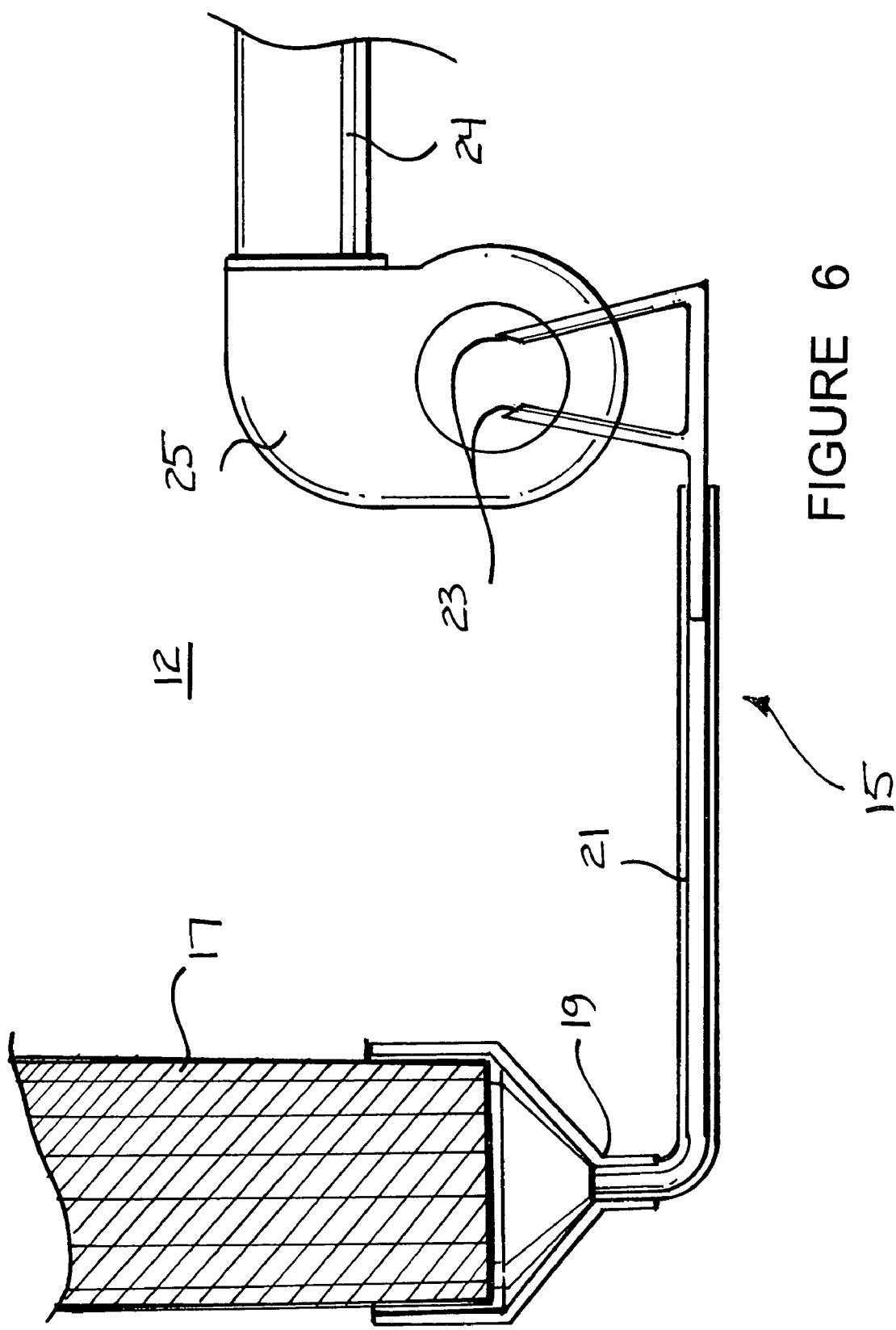
FIG. 6 is a simplified drawing of the water extraction apparatus.

This problem is solved by the apparatus of the present invention. As illustrated in FIG. 6 condensation that accumulates as a result of the cooling action within module 12 is removed by means of a venturi system, generally designated 15. Within module 12, an evaporator 17 accumulates condensation as a result of the cooling action therein. Evaporator 17 includes a drain passage 19 with a drain tube 21 that conducts the condensate from evaporator 17 to one or more extraction venturi tubes 23 positioned, preferably, in a low pressure area in a blower 25 within module 12. Preferably, blower 25 is an internal blower drawing external air into duct 20, blowing it across the condenser and forcing the warmed air out through duct 24. However, blower 25 could be an additional blower contained within module 12 in some applications. As should be understood, venturi tubes 23 communicate with the condensed water within module 12 and are positioned so that air drawn in by blower 25 and traveling out duct 24 passes over venturi tubes 23 thereby drawing the moisture out of module 12 along with the waist heat.

Figure 2:
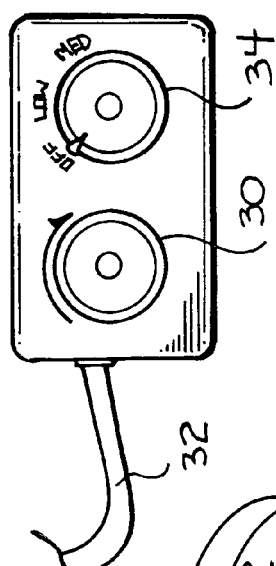
FIG. 2 is simplified view of a control box for the portable vapor cycle air conditioning unit FIG. 1.

Referring additionally to FIG. 2, a control box 30 is illustrated that is connected to the electrical components within module 12 by means of a control cable 32. Module 12 includes a variable speed compressor which is controlled by control box 30 to a desired temperature. As illustrated in FIG. 2, control box 30 includes a first control with four settings: off; low; medium; and high. Control box 30 also includes a second control which controls the temperature of the air being emitted through outlet vent 18. The variable speed compressor allows better control of portable vapor cycle air conditioning unit 10, rather than simply turning the unit off or on to control temperature as required in many prior art units.

Figure 3:
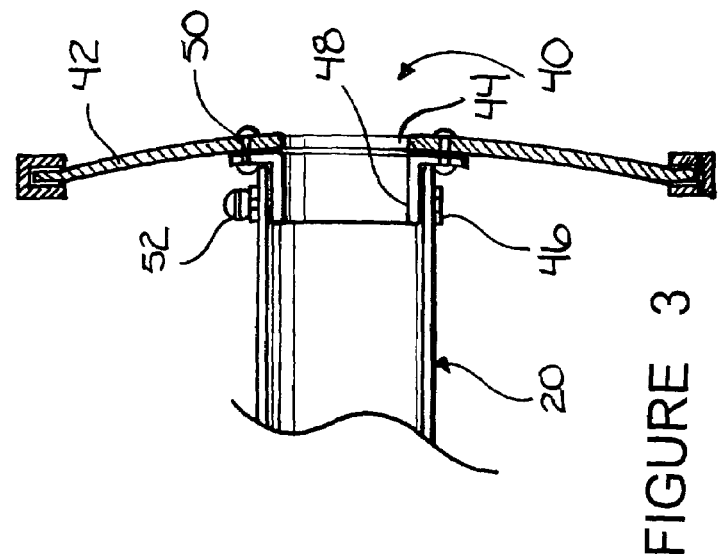
FIG. 3 is a sectional view of a duct inlet/outlet for the portable vapor cycle air conditioning unit of FIG. 1.
Figure 4:
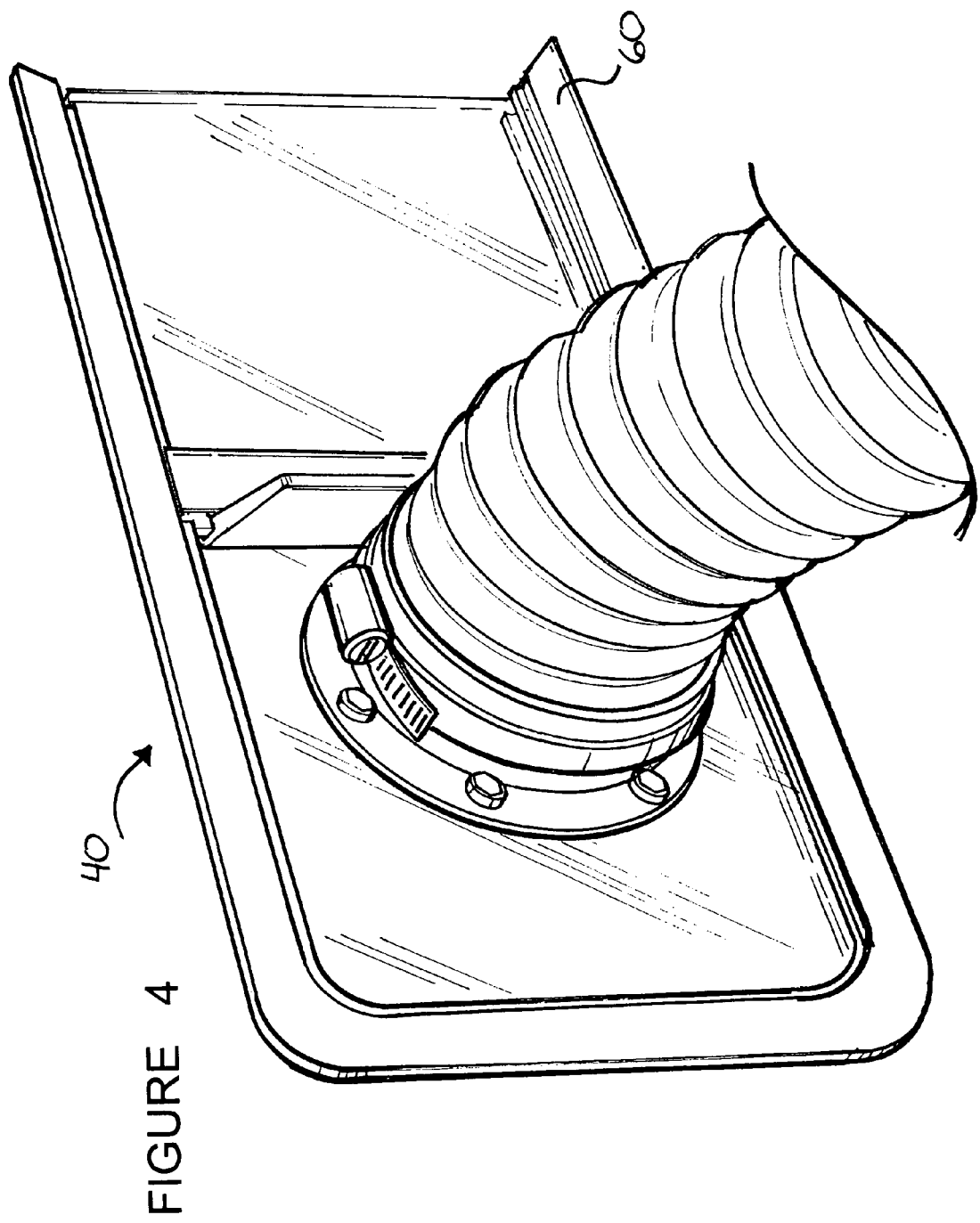
FIG. 4 is an isometric view of the duct inlet/outlet of FIG. 3.

Referring to FIGS. 3 and 4, apparatus, generally designated 40, is illustrated for connecting the external end of either air duct 20 or air duct 24 to an opening in a window. In this example duct 20 is used but both ducts will generally be connected with similar apparatus. Referring specifically to FIG. 3, a window 42 has a circular opening 44 cut therethrough. A short cylindrical connector 46 includes a cylindrical portion 48 with a radially outwardly extending flange 50 at one end. The central opening through cylindrical portion 48 is approximately the same diameter as opening 44 in window 42. Flange 50 has a plurality of mounting holes extending therethrough and spaced around the periphery of cylindrical portion 48. Mating holes are formed through window 42 around opening 44.

To mount connector 46 on window 42, flange 50 is positioned against the inner surface of window 42 so that cylindrical connector 46 is coaxial with opening 42 and the holes through flange 50 mate with the holes through window 42. Bolts are inserted through the holes and nuts are tightened on them to hold cylindrical connector 46 firmly in place. The external end of duct 20 is then fitted coaxially over cylindrical portion 48 and a clamp 52 is fitted over the end of duct 20 and tightened onto cylindrical portion 48 to hold duct 20 firmly in place.

Here it should be understood that window 42 can be a window that can be removed and replaced with a solid window when it is desired to remove portable vapor cycle air conditioning unit 10 from the aircraft. In instances where portable vapor cycle air conditioning unit 10 is removed temporarily (e.g. to provide more room in the aircraft, etc.) window 42 may simply be left in place and a cover, glass or otherwise, may be placed over or in cylindrical portion 48 of connector 46. In one embodiment, window 42 simply slides into a horizontal track 60 so that changing window 42 for a solid pane is very simple.

Figure 5:
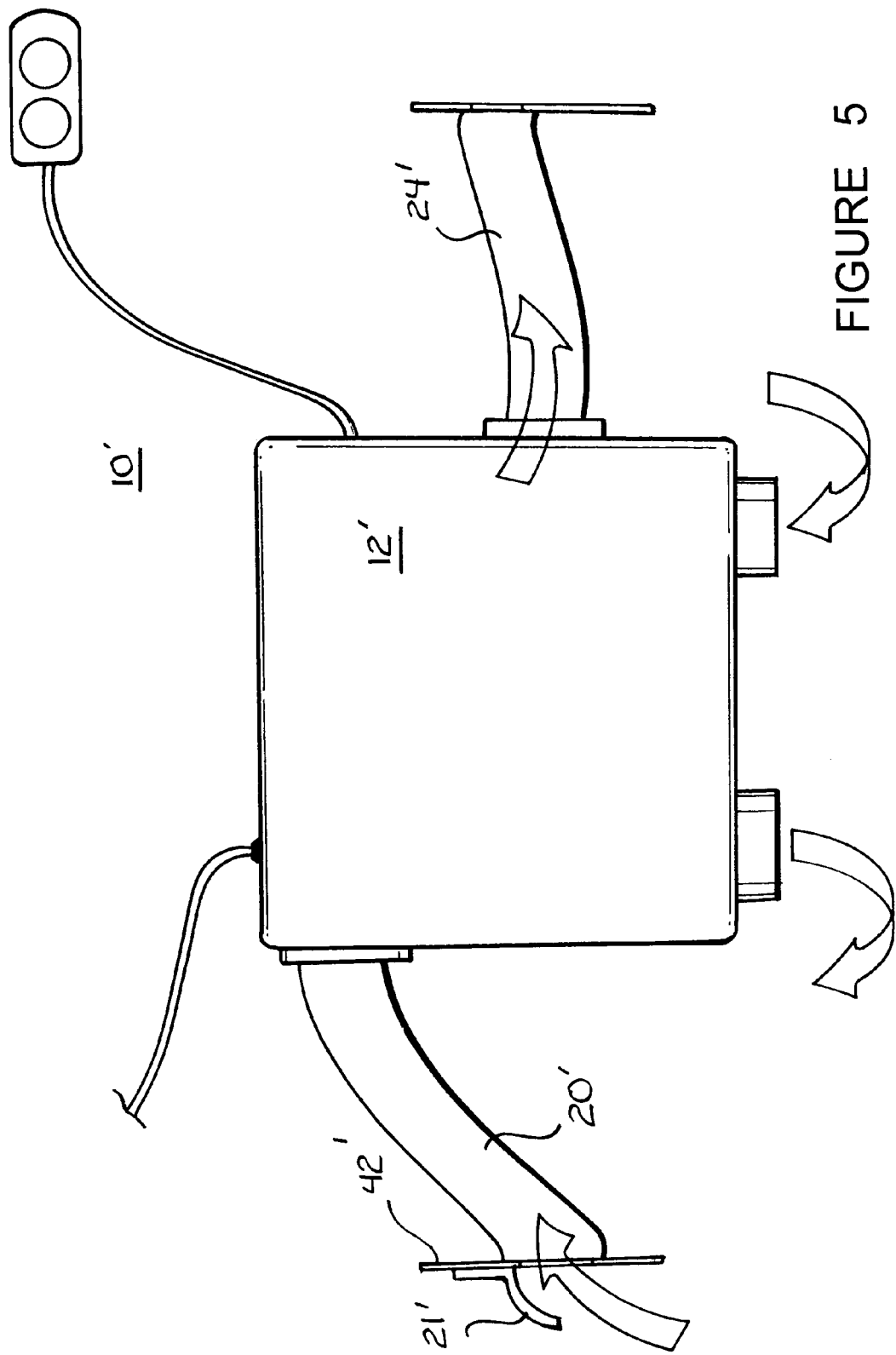
FIG. 5 is a view similar to FIG. 1 of a different embodiment.

Referring to FIG. 5, a somewhat different embodiment is illustrated in which components similar to the embodiment illustrated in FIG. 1 are designated with similar numbers having a prime added to indicate the different embodiment. In this embodiment inlet air duct 20' is connected to a window 42', as described above, but an air scoop is mounted to the outer surface of window 42 so that forward movement of the aircraft forces air into inlet duct 20', through module 12', and out outlet duct 24'. Duct 21' can be attached to window 42' in a variety of ways as, for example, by extending cylindrical portion 48' through opening 44' in window 42' and attaching scoop 21' to it.

Thus, a new and novel portable vapor cycle air conditioning unit for small aircraft has been disclosed that can be easily and quickly positioned in the cabin of a small aircraft and includes ducts attached to windows within the aircraft for removing waist heat from the condenser. Also, normally occurring condensate within the unit is eliminated through the waist heat duct. No permanent alterations to the aircraft are required and removal of the portable vapor cycle air conditioning unit during periods of non-use can be accomplished quickly and easily so that the aircraft is not burdened with the unit during non-use.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A portable vapor cycle air conditioning unit for small aircraft comprising:
   a single portable module including an evaporator, a condenser/compressor and cooling coils operably connected together, the module being designed to be positioned within a cabin of the small aircraft so that cabin air is drawn into a cabin air inlet in the module, passes over the cooling coils, and is expelled through a cabin air outlet;

a first air duct having a fresh air inlet end with mounting apparatus for mounting the fresh air inlet end in a window of the small aircraft, the first air duct having a fresh air outlet end;

a second air duct having a waste heat air outlet end with mounting apparatus for mounting the waste heat air outlet end in a window of the small aircraft, the second air duct having a waste heat air inlet end;

a venturi system positioned to draw condensate from the evaporator and expel the condensate through the waste heat air outlet end of the second air duct; and a blower in communication with the fresh air outlet end of the first air duct and the waste heat air inlet end of the second air duct for flowing the fresh air from the first air duct over the condenser/compressor and carrying waste heat out through the second air duct.

2. A portable vapor cycle air conditioning unit for small aircraft as claimed in claim 1 wherein the venturi system includes at least one venturi tube positioned in the blower and coupled to a drain in the evaporator for drawing condensate from the evaporator, through the drain, and out the venturi tube.

3. A portable vapor cycle air conditioning unit for small aircraft comprising:

a single portable module including an evaporator, a condenser/compressor and cooling coils operably connected together, the module being designed to be positioned within a cabin of the small aircraft so that cabin air is drawn into a cabin air inlet in the module, passes over the cooling coils, and is expelled through a cabin air outlet;

wherein the condenser/compressor is a variable speed compressor and the module further includes a control box designed to be connected to an electrical system of the small aircraft and provide electrical power to the variable speed compressor, the control box including a variable control connected to control the speed of the variable speed compressor;

a first air duct having a fresh air inlet end with mounting apparatus for mounting the fresh air inlet end in a window of the small aircraft, the first air duct having a fresh air outlet end;

a second air duct having a waste heat air outlet end with mounting apparatus for mounting the waste heat air outlet end in a window of the small aircraft, the second air duct having a waste heat air inlet end; and a blower in communication with the fresh air outlet end of the first air duct and the waste heat air inlet end of the second air duct for flowing the fresh air from the first air duct over the condenser/compressor and carrying waste heat out through the second air duct.

4. A portable vapor cycle air conditioning unit for small aircraft comprising:

a single portable module including an evaporator, a condenser/compressor and cooling coils operably connected together, the module being designed to be positioned within a cabin of the small aircraft so that cabin air is drawn into a cabin air inlet in the module, passes over the cooling coils, and is expelled through a cabin air outlet;

a first air duct having a fresh air inlet end with mounting apparatus for mounting the fresh air inlet end in a window of the small aircraft, the first air duct having a fresh air outlet end;

wherein the mounting apparatus of the fresh air inlet end of the first air duct includes a cylindrical portion designed to be coaxially engaged with the fresh air inlet end, a flange surrounding the cylindrical portion and designed to be positioned against the window coaxial with an opening through the window and affixed to the window;

a second air duct having a waste heat air outlet end with mounting apparatus for mounting the waste heat air outlet end in a window of the small aircraft, the second air duct having a waste heat air inlet end; and a blower in communication with the fresh air outlet end of the first air duct and the waste heat air inlet end of the second air duct for flowing the fresh air from the first air duct over the condenser/compressor and carrying waste heat out through the second air duct.

5. A portable vapor cycle air conditioning unit for small aircraft comprising:

a single portable module including an evaporator, a condenser/compressor and cooling coils operably connected together, the module being designed to be positioned within a cabin of the small aircraft so that cabin air is drawn into a cabin air inlet in the module, passes over the cooling coils, and is expelled through a cabin air outlet;

a first air duct having a fresh air inlet end with mounting apparatus for mounting the fresh air inlet end in a window of the small aircraft, the first air duct having a fresh air outlet end;

a second air duct having a waste heat air outlet end with mounting apparatus for mounting the waste heat air outlet end in a window of the small aircraft, the second air duct having a waste heat air inlet end;

wherein the mounting apparatus of the waste air outlet end of the second air duct includes a cylindrical portion designed to be coaxially engaged with the fresh air inlet end, a flange surrounding the cylindrical portion and designed to be positioned against the window coaxial with an opening through the window and affixed to the window; and a blower in communication with the fresh air outlet end of the first air duct and the waste heat air inlet end of the second air duct for flowing the fresh air from the first air duct over the condenser/compressor and carrying waste heat out through the second air duct.

6. A portable vapor cycle air conditioning unit for small aircraft comprising:

a single portable module including an evaporator, a condenser/compressor and cooling coils operably connected together, the module being designed to be positioned within a cabin of the small aircraft so that cabin air is drawn into a cabin air inlet in the module, passes over the cooling coils, and is expelled through a cabin air outlet;

a first air duct having a fresh air inlet end with mounting apparatus for mounting the fresh air inlet end in a window of the small aircraft, the first air duct having a fresh air outlet end;

a second air duct having a waste heat air outlet end with mounting apparatus for mounting the waste heat air outlet end in a window of the small aircraft, the second air duct having a waste heat air inlet end;

a blower in communication with the fresh air outlet end of the first air duct and the waste heat air inlet end of the second air duct for flowing the fresh air from the first air duct over the condenser/compressor and carrying waste heat out through the second air duct; and a venturi system in the module and positioned to draw condensate from the evaporator and expel the condensate through the waste heat air outlet end of the second air duct.

7. A portable vapor cycle air conditioning unit for small aircraft as claimed in claim 6 wherein the venturi system includes at least one venturi tube positioned in the blower and coupled to a drain in the evaporator for drawing condensate from the evaporator, through the drain, and out the venturi tube.

8. A portable vapor cycle air conditioning unit for small aircraft as claimed in claim 6 wherein the condenser/compressor is a variable speed compressor and the module further includes a control box designed to be connected to an electrical system of the small aircraft and provide electrical power to the variable speed compressor, the control box including a variable control connected to control the speed of the variable speed compressor.

9. A portable vapor cycle air conditioning unit for small aircraft as claimed in claim 6 wherein the mounting apparatus of the fresh air inlet end of the first air duct includes a cylindrical portion designed to be coaxially engaged with the fresh air inlet end, a flange surrounding the cylindrical portion and designed to be positioned against the window coaxial with an opening through the window and affixed to the window.

10. A portable vapor cycle air conditioning unit for small aircraft as claimed in claim 6 wherein the mounting apparatus of the waste air outlet end of the second air duct includes a cylindrical portion designed to be coaxially engaged with the fresh air inlet end, a flange surrounding the cylindrical portion and designed to be positioned against the window coaxial with an opening through the window and affixed to the window.

* * * * *